(12) United States Patent
Metzbower et al.

(10) Patent No.: US 10,408,383 B2
(45) Date of Patent: Sep. 10, 2019

(54) BOSS AND SEAL FOR A HIGH-PRESSURE VESSEL

(71) Applicant: Carleton Technologies, Inc., Orchard Park, NY (US)

(72) Inventors: Christopher L. Metzbower, New Windsor, MD (US); Richard K. Pemberton, Columbia, MD (US)

(73) Assignee: Carleton Technologies, Inc., Orchard Park, NY (US)

( * ) Notice: Subject to any disclaimer, the term of this patent is extended or adjusted under 35 U.S.C. 154(b) by 26 days.

(21) Appl. No.: 15/337,881

(22) Filed: Oct. 28, 2016

(65) Prior Publication Data

US 2017/0122437 A1 May 4, 2017

Related U.S. Application Data

(60) Provisional application No. 62/248,343, filed on Oct. 30, 2015.

(51) Int. Cl.
| | |
|---|---|
| *F17C 1/16* | (2006.01) |
| *F16J 12/00* | (2006.01) |
| *F17C 1/00* | (2006.01) |

(52) U.S. Cl.
CPC ............... *F17C 1/16* (2013.01); *F16J 12/00* (2013.01); *F17C 1/00* (2013.01); *F17C 2203/0604* (2013.01); *F17C 2203/066* (2013.01); *F17C 2203/0619* (2013.01); *F17C 2203/0629* (2013.01); *F17C 2203/0636* (2013.01); *F17C 2203/0663* (2013.01); *F17C 2205/0305* (2013.01); *F17C 2209/228* (2013.01); *F17C 2260/012* (2013.01); *F17C 2270/01* (2013.01)

(58) Field of Classification Search
CPC ........ F17C 2205/0305; F17C 2209/228; F17C 1/16
USPC .......................................................... 220/586
See application file for complete search history.

(56) References Cited

U.S. PATENT DOCUMENTS

| | | | |
|---|---|---|---|
| 8,733,581 B1* | 5/2014 | Olson ..................... | F17C 1/06 220/586 |
| 2008/0047963 A1* | 2/2008 | Wilson ................... | F17C 13/06 220/582 |
| 2013/0341337 A1* | 12/2013 | Patterson ............... | F17C 1/06 220/586 |

FOREIGN PATENT DOCUMENTS

WO WO2014/106290 A1 * 7/2014

* cited by examiner

*Primary Examiner* — Andrew T Kirsch
*Assistant Examiner* — Don M Anderson
(74) *Attorney, Agent, or Firm* — Bond, Schoeneck & King, PLLC

(57) ABSTRACT

A pressure vessel including a boss, liner, and shell to create a vessel capable of storing high-pressure fluids with minimal weight. The boss includes a through aperture and at least one recess to receive at least one fastener. The liner includes an interior surface, an exterior surface, and an annular insert to receive the fastener(s). The interior surface defines an interior cavity of the pressure vessel. The liner is configured to secure the boss to its exterior surface using the fastener(s) and the annular insert. After securing the boss to the liner, the composite wrap is applied to the boss and liner so as to surround the liner and at least a portion of the boss.

15 Claims, 4 Drawing Sheets

BOSS AND SEAL FOR A HIGH-PRESSURE VESSEL

CROSS REFERENCE

This application claims the benefit of the filing date of U.S. Provisional Patent Application Ser. No. 62/248,343, filed Oct. 30, 2015, which is hereby incorporated by reference in its entirety.

FIELD OF THE INVENTION

The present disclosure is directed generally to methods and systems for high-pressure vessels, and more particularly, to a novel boss attachment mechanism.

BACKGROUND

Pressure vessels are used in many industry sectors for the high-pressure storage of fluids. These fluids are primarily gaseous. In industries where weight is not a major concern, these pressure vessels are frequently made from monolithic materials, such as metals. In other industries such as aerospace, vehicles, and emergency first responders, the weight of a pressure vessel is critical to its functionality. In these areas, composite pressure vessels provide a unique advantage. The ability to construct the vessel with the mechanical properties of the material directionally aligned with the stresses in the vessel allows for greatly decrease weight.

One frequently employed method for the fabrication of composite pressure vessels is filament winding. In filament winding one or more strands of fiber, (e.g., carbon, glass, aramid) is impregnated with resin and then wound into the shape of a pressure vessel and cured. To obtain the shape of the pressure vessel, fabricators typically use a mandrel, also known as a liner. The liner provides the base geometry of the vessel, provides provisions for valve and or fitting attachments, and serves as a bladder for fluids in the finished vessel. Pressure vessel liners are typically made from metals with thin walls that could not handle the pressure load without the composite overwrap, known as type-3 vessels. Liners may also be constructed from plastics with metallic boss (port) fittings attached to the plastic. Plastic liners are used in pressure vessels for cost savings and decreased weight. Such vessels require a metallic port for attachment of fittings that enable filling and discharging the vessel, as well as containing the pressure. The sealing of the metallic boss to the plastic liner can be a challenging task when the vessel contains a gaseous fluid at high pressure and the vessel must operate over a large temperature range such as −40° F. to 185° F.

Accordingly, there is a continued need in the art for affordable and efficient high-pressure vessels that enable sealing of the boss to the plastic liner.

SUMMARY OF THE INVENTION

Accordingly, the present disclosure is directed to a novel configuration for attaching a boss to the plastic liner of a high-pressure fluid vessel having a composite shell. In one example embodiment, an annular metallic insert is molded such that it is encapsulated in the plastic liner. The annular metallic insert contains provisions for receiving threaded fasteners. The insert may also be recessed from the outer surface of the plastic liner. The liner can be created by rotational, blow-molding, or other plastic molding techniques.

The boss of the example embodiment, which attaches to the plastic liner, has a cylindrical neck with a passageway through the middle for filling and discharging the vessel. This passageway also provides provisions for attaching valves or other fittings to contain pressure and control filling and discharging. The boss can be made from, for example, aluminum, titanium, steel alloys, stainless steel alloys, nickel, or other metals.

The boss of the example embodiment includes a flange feature that is configured to be in contact with the plastic liner. The flange contains a gland in which an elastomeric O-ring seal can be placed. The boss with the O-ring is attached to the plastic liner prior to applying the composite shell by means of threaded fasteners. The tension in the threaded joints may be set while the liner and boss assembly are at an elevated temperature. The assembly of the boss to liner seal at elevated temperature allows for the O-ring to seat into the plastic liner. This seating creates a gland in the plastic which provides side support to the O-ring seal, which helps prevent extrusion. The depth that the O-ring and boss deform the plastic liner during this assembly can be controlled by a recess between the annular metallic insert and the surface of the plastic liner.

In one aspect, a high-pressure vessel is provided. The high-pressure vessel includes: (i) a boss defining a boss aperture and comprising at least one recess configured to receive a fastener; (ii) a liner defining a liner aperture and comprising an interior surface, an exterior surface, and an annular insert configured to receive the fastener, wherein the interior surface defines at least a portion of an interior cavity of the pressure vessel, and wherein the liner is configured to secure the boss to the exterior surface using the at least one fastener, the at least one recess, and the annular insert; and (iii) a composite shell covering at least a portion of the exterior surface of the liner and at least a portion of the boss, wherein the boss aperture and the liner aperture are substantially aligned.

According to an embodiment, a top surface of the annular insert is partially recessed relative to the exterior surface of the liner.

According to an embodiment, the liner is configured to at least partially deform as the boss is secured to the liner, wherein contact is made between the boss and the annular insert when the liner is at least partially deformed.

According to an embodiment, the boss comprises a gland defined in the inner surface encircling the through aperture, and further including an O-ring positioned within the gland and configured to abut the exterior surface of the liner.

According to an embodiment, the liner is configured to at least partially deform as the boss is secured to the liner, wherein an impression is made by the O-ring into the liner as a result of the at least partial deformation.

According to an embodiment, the annular insert includes a shoulder portion axially aligned with the O-ring and configured to provide support for the liner as the liner is deformed by the O-ring.

According to an embodiment, the boss comprises a plurality of flat portions around its periphery, configured to prevent the shell from rotating with respect to the boss.

According to an embodiment, the boss comprises a plurality of rounded portions around its periphery, configured to prevent the shell from rotating with respect to the boss.

According to an embodiment, the plurality of flat portions and the plurality of rounded portions are interspersed around a periphery of the boss.

According to an embodiment, the boss comprises an upper flange configured to prevent the boss from moving axially toward or away from the center of the vessel.

According to an embodiment, the boss comprises a lower flange configured to prevent the boss from moving axially toward or away from the center of the vessel.

According to an embodiment, the boss and annular insert are metallic and the liner is plastic.

According to an embodiment, the at least one fastener is a screw.

According to an aspect is an apparatus for a pressure vessel. The apparatus includes: a boss defining a boss aperture and comprising at least one recess configured to receive a fastener; and a liner defining a liner aperture and comprising an interior surface, an exterior surface, and an annular insert configured to receive the fastener, wherein the interior surface defines at least a portion of an interior cavity of the pressure vessel, and wherein the liner is configured to secure the boss to the exterior surface using the at least one fastener, the at least one recess, and the annular insert; wherein the boss aperture and the liner aperture are substantially aligned.

According to an aspect is a pressure vessel. The pressure vessel includes: (i) a boss defining a boss aperture and comprising at least one recess configured to receive a fastener, wherein the boss further comprises a gland defined in the inner surface encircling the through aperture, and an O-ring positioned within the gland, wherein the boss further comprises a plurality of flat portions and a plurality of rounded portions around its periphery, wherein the plurality of flat portions and the plurality of rounded portions are interspersed around a periphery of the boss; (ii) a liner defining a liner aperture and comprising an interior surface, an exterior surface, and an annular insert configured to receive the fastener, wherein the interior surface defines at least a portion of an interior cavity of the pressure vessel, and wherein the liner is configured to secure the boss to the exterior surface using the at least one fastener, the at least one recess, and the annular insert; and (iii) a composite shell covering at least a portion of the exterior surface of the liner and at least a portion of the boss, wherein the boss aperture and the liner aperture are substantially aligned.

These and other embodiments are described or otherwise envisioned herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF EMBODIMENTS

The present disclosure describes various embodiments of a high-pressure vessel system including a novel boss attachment for filling and discharging of fluid in the vessel. The boss of the high-pressure vessel system defines an aperture therethrough, and one or more recesses each receiving a fastener. The high-pressure vessel system also includes a liner having one or more annular inserts each configured to receive one of the fasteners. A composite wrap surrounds the liner and the boss.

Figure 1:
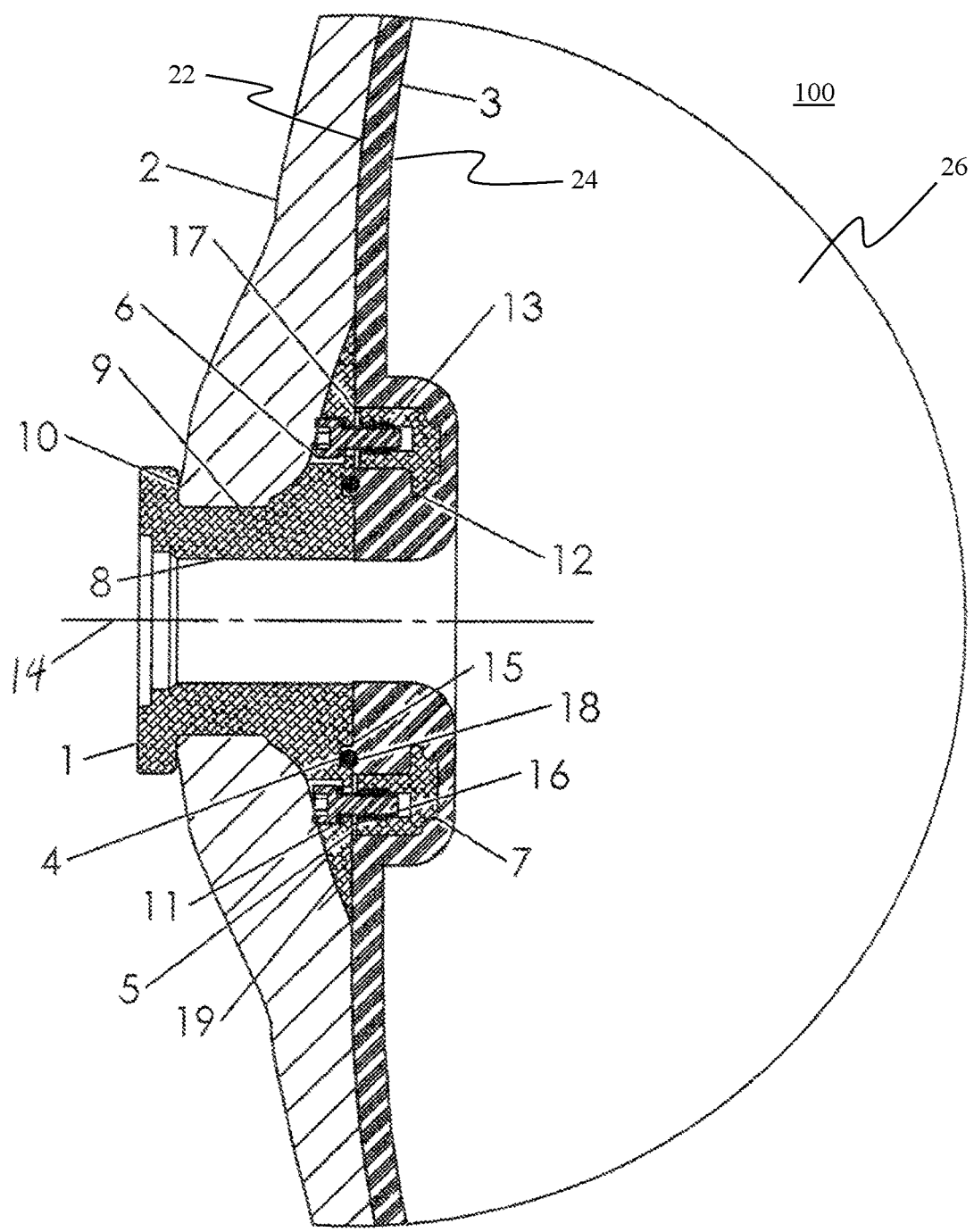
FIG. 1 is a cross-sectional view of a boss and seal for a high-pressure vessel, in accordance with an embodiment.

Referring to FIG. 1, in one embodiment, is a cross-sectional view of a portion of a high-pressure vessel 100. The vessel includes a boss 1, a composite shell 2, and a liner 3. According to an embodiment, boss 1 is composed of a metallic material such as, for example, aluminum, titanium, steel alloys, stainless steel alloys, nickel, and other metals. Boss 1 defines an approximately circular aperture 8 therethrough, along the centerline axis 14 of the boss, which happens to be the centerline axis of the vessel in the embodiment depicted in FIG. 1.

The vessel also includes a plastic liner 3 defining an approximately circular aperture therethrough, with the circular aperture of liner 3 aligning with the aperture 8 of the boss to allow the flow of fluid. The plastic liner includes an exterior surface 22 and an interior surface 24, where the inner surface at least partially defines a portion of the cavity 26 of the vessel. The plastic liner 3 also includes an annular metallic insert 7 which is at least partially encapsulated within the plastic liner 3. The insert 7 contains a plurality of provisions 13, which may be threaded, each configured to receive a threaded fastener 6. In one example embodiment, the threaded provisions 13 in the insert contain a stainless-steel alloy helical screw thread insert. According to an embodiment, the fasteners 6 may be prevented from disengaging the threads by means of a metallic split lock washer 11.

According to an embodiment, the top of the metallic insert 7 may be level with the outer surface of the plastic liner 3, or the top of the metallic insert 7 may be recessed from the outer surface of the plastic liner by a spacing 5. Spacing 5 may be, for example, a predetermined depth.

The metallic boss 1 comprises a gland 15 at an interface of the boss and the liner. As shown in the cross-sectional view in FIG. 2, the gland 15 can be a circular structure formed within the inner surface of the boss structure. The gland 15 is configured to receive an elastomeric O-ring gland seal 4.

According to an embodiment, this portion of the high-pressure vessel 100 is formed by placing the elastomeric O-ring gland seal 4 into gland 15 of the metallic boss 1. Boss 1 is then attached to the liner 3 by means of the plurality of threaded fasteners 6 which pass first through the main boss body via a fastener recess 28, then thread into the provisions 13 formed in the metallic insert 7. This pulls the boss and liner together, and compresses the elastomeric O-ring gland seal 4. According to an embodiment, the assembly procedure occurs prior to applying the composite shell 2, and is typically performed at an elevated temperature.

According to an embodiment, the torque applied to the fasteners 6 is converted to a tensile load, and the resultant forces deform the plastic liner 3. The plastic liner 3 continues to deform until the inner surface 16 of boss 1 makes metal-to-metal contact with the recessed face of the insert 17. Accordingly, the plastic liner 3 deforms to approximately the predetermined distance 5.

According to an embodiment, the insert 7 can comprise a continuous annular feature 12, which may be axially in-line with the O-ring 4, to provide support for the O-ring 4 and help minimize cold flow of the plastic liner 3 as a result of the stresses applied from the O-ring 4. For example, as the O-ring 4 seats into the plastic liner 3 it forms an impression 18 in the plastic liner 3. The impression 18 provides side support to the O-ring 4, and can help minimize the risk of the O-ring 4 extruding out of the gland 15 due to the forces being applied.

A composite shell 2 is applied over the plastic liner 3 and metallic boss 1. The composite shell 2 can interlock with one or more flat portions 9 of boss 1, which may be recessed relative to a flange 10 of the boss, once the shell is cured. For example, as shown more clearly in FIG. 3, while much of the recessed portion of boss 1 is rounded along the outer surface, the one or more flat portions 9 are spaced along this outer surface. The interaction between these flat portions 9 and the cured composite shell 2 prevents the boss and the plastic liner from rotating within the composite shell along the centerline axis 14 of the vessel.

Additionally, the flange feature 10 on the metallic boss 1 can include a flange feature 10, which extends outwardly from the top surface of the boss in a direction perpendicular to the centerline axis 14 of the vessel. When the composite shell 2 is cured and forms the interlock with the boss 1, the flange feature 10 prevents boss 1 from being pushed axially inward into the vessel if force is applied to the top of the boss. According to an embodiment, boss 1 can include a second flange feature 19, which extends outwardly from the boss in a direction perpendicular to the centerline axis 14 of the vessel. Flange featured 19 prevents boss 1 from being forced axially away from the center of the vessel, and past the composite shell 2, when the vessel is pressured.

Figure 2:
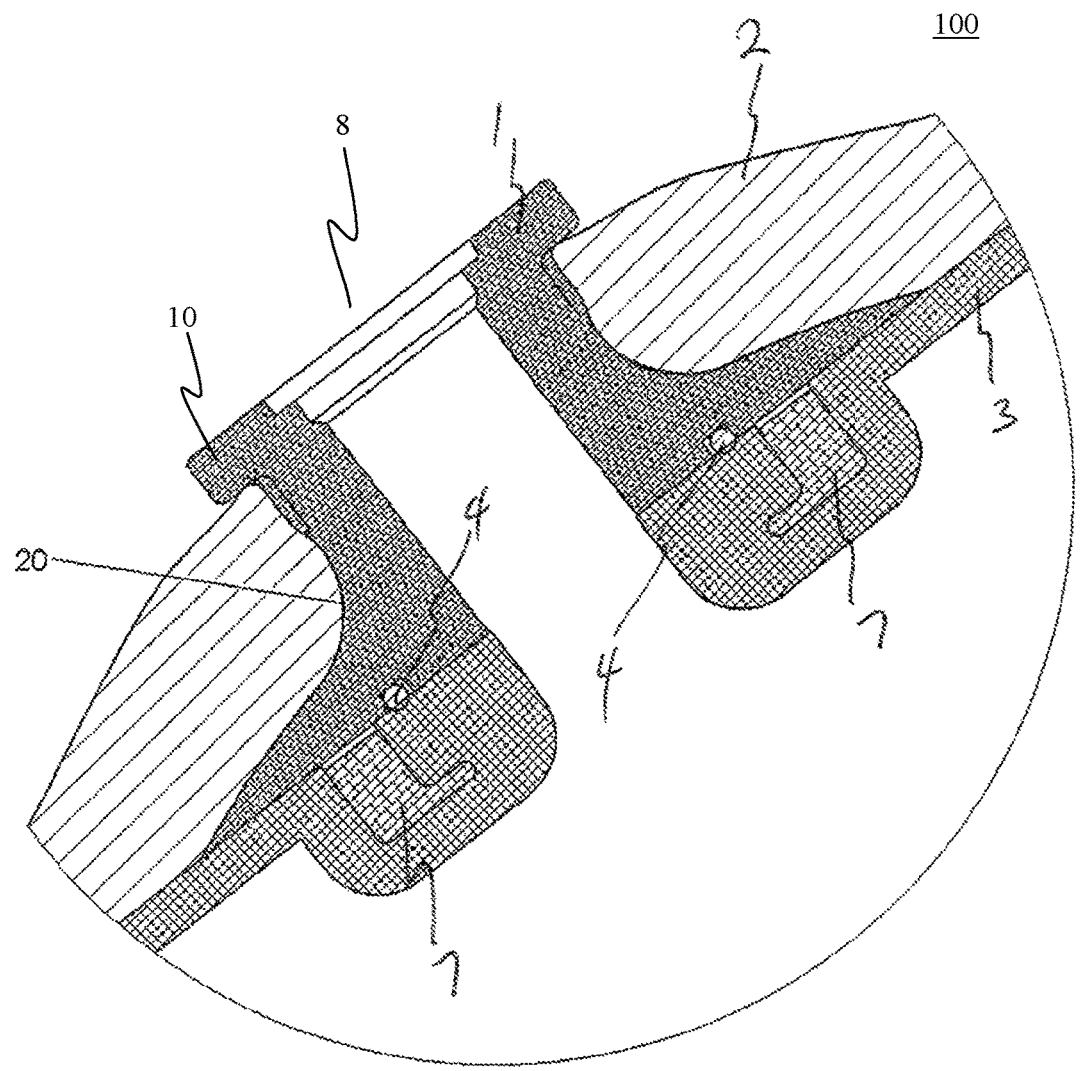
FIG. 2 is a cross-sectional view of a boss and seal for a high-pressure vessel, in accordance with an embodiment.

Referring to FIG. 2, in one embodiment, is a simplified cross-sectional view of a portion of a high-pressure vessel 100, including a boss 1, a composite shell 2, and a liner 3. Boss 1 also comprises an elastomeric O-ring gland seal 4 in the gland of the metallic boss 1. FIG. 2 shows the concave or rounded portions 20 on much of the recessed surface of boss 1. In contrast with FIG. 2, this view does not show the one or more flat portions 9 spaced along this outer surface. Accordingly, by comparing the figures, it is shown that the flat portions 9 and rounded portions 20 are interspersed along this recessed surface of boss 1. This interspersed configuration provides additional locking to prevent boss 1 from being pushed axially toward the center of the vessel.

Figure 3:
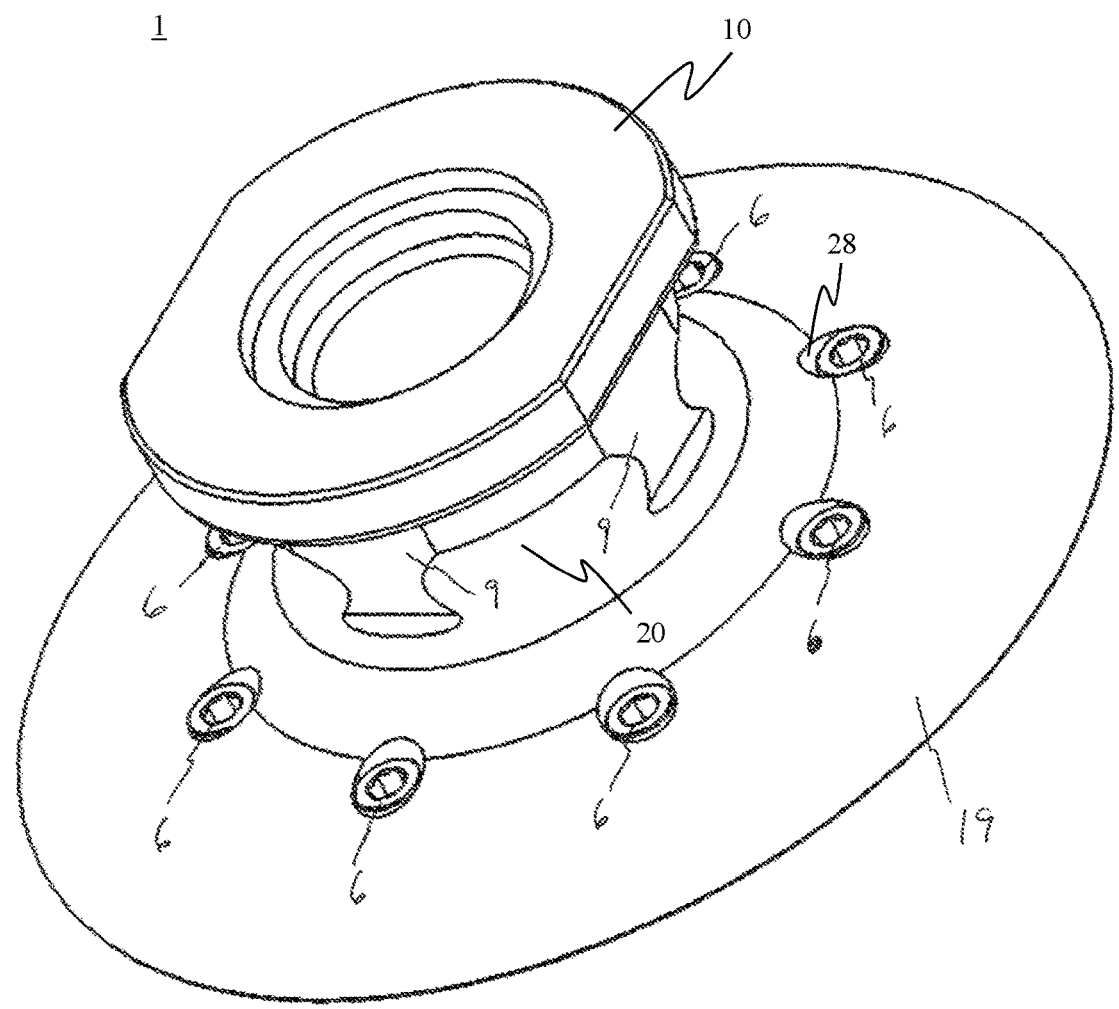
FIG. 3 is a perspective view of a boss for a high-pressure vessel, in accordance with an embodiment.
Figure 4:
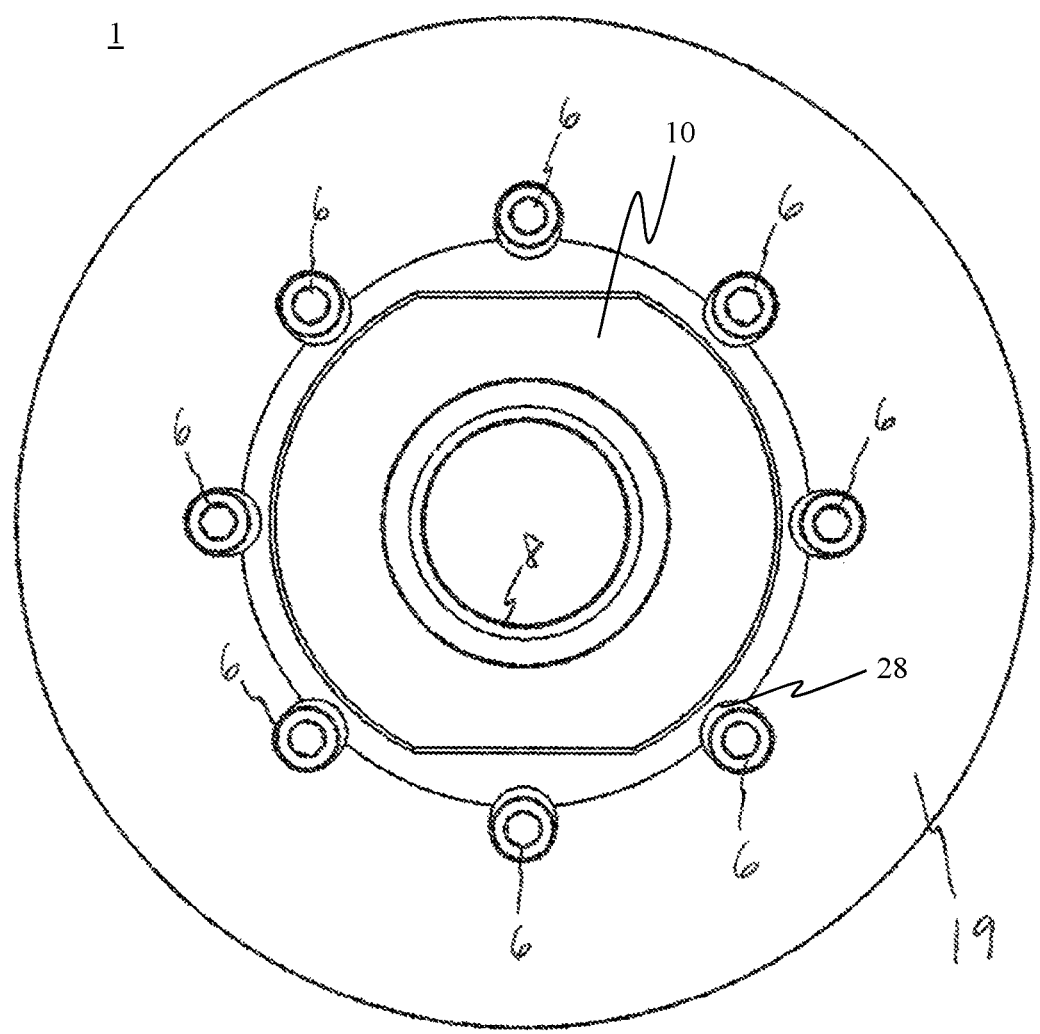
FIG. 4 is a perspective view of a boss for a high-pressure vessel, in accordance with an embodiment.

Referring to FIG. 3, in one embodiment, is a perspective side view of a boss 1. Boss 1 includes an upper flange 10, a lower flange 19, interspersed flat portions 9 and rounded portions 20, and a plurality of fasteners 6 each within a fastener recess 28. Referring to FIG. 4, in one embodiment, is a top view of a boss 1. The boss includes an upper flange 10, a lower flange 19, and a plurality of fasteners 6 each within a fastener recess 28. Although FIG. 4 comprises eight fasteners and recesses, it is understood that any suitable number of fasteners can be used.

While this invention has been particularly shown and described with references to example embodiments thereof, it will be understood by those skilled in the art that various changes in form and details may be made therein without departing from the scope of the invention encompassed by the appended claims. For example, any suitable number of fasteners may be used, and any number of bosses may be attached to a plastic liner, among many other possible variations.

What is claimed is:

1. A pressure vessel (100) comprising:
    a boss (1) defining a boss aperture (8) along a centerline axis (14) and comprising at least one recess (28) configured to receive a fastener (6);
    a liner (3) defining a liner aperture and comprising an interior surface (24), an exterior surface (22), and an annular insert (7) comprising an L-shaped cross-section having a shoulder portion (12) and axially extending provision (13) configured to receive the fastener, wherein the shoulder portion (12) of the annular insert (7) radially extends from the axially extending provision (13) towards the centerline axis, wherein the interior surface defines at least a portion of an interior cavity (26) of the pressure vessel, and wherein the liner is configured to secure the boss to the exterior surface using the at least one fastener, the at least one recess, and the annular insert; and
    a composite shell (2) covering at least a portion of the exterior surface of the liner and at least a portion of the boss;
    wherein the boss aperture and the liner aperture are substantially aligned.

2. The pressure vessel of claim 1, wherein a top surface of the annular insert is partially recessed relative to the exterior surface of the liner.

3. The pressure vessel of claim 2, wherein the liner is configured to at least partially deform as the boss is secured to the liner, wherein contact is made between the boss and the annular insert when the liner is at least partially deformed.

4. The pressure vessel of claim 1, wherein the boss comprises a gland (15) defined in the inner surface (16) encircling the through aperture, and further including an O-ring (4) positioned within the gland and configured to abut the exterior surface of the liner.

5. The pressure vessel of claim 4, wherein the liner is configured to at least partially deform as the boss is secured to the liner, wherein an impression is made by the O-ring into the liner as a result of the at least partial deformation.

6. The pressure vessel of claim 5, wherein the annular insert radially extending shoulder portion (12) is axially aligned with the O-ring and configured to provide support for the liner as the liner is deformed by the O-ring.

7. The pressure vessel of claim 1, wherein the boss comprises a plurality of flat portions (9) around its periphery, configured to prevent the shell from rotating with respect to the boss.

8. The pressure vessel of claim 7, wherein the boss comprises a plurality of rounded portions (20) around its periphery, configured to prevent the shell from rotating with respect to the boss.

9. The pressure vessel of claim 8, wherein the plurality of flat portions and the plurality of rounded portions are interspersed around a periphery of the boss.

10. The pressure vessel of claim 1, wherein the boss comprises an upper flange (10) configured to prevent the boss from moving axially toward or away from the center of the vessel.

11. The pressure vessel of claim 1, wherein the boss comprises a lower flange (19) configured to prevent the boss from moving axially toward or away from the center of the vessel.

12. The pressure vessel of claim 1, wherein the boss and annular insert are metallic and the liner is plastic.

13. The pressure vessel of claim 1, wherein the at least one fastener is a screw.

14. An apparatus for a pressure vessel (100), the apparatus comprising:
    a boss (1) defining a boss aperture (8) along a centerline axis (14) and comprising at least one recess (28) configured to receive a fastener (6); and a liner (3) defining a liner aperture and comprising an interior surface (24), an exterior surface (22), and an annular insert (7) comprising an L-shaped cross-section having a shoulder portion (12) and axially extending provision (13) configured to receive the fastener, wherein the shoulder portion (12) of the annular insert (7) radially extends from the axially extending provision (13) towards the centerline axis, wherein the interior surface defines at least a portion of an interior cavity (26) of the pressure vessel, and wherein the liner is configured to secure the boss to the exterior surface using the at least one fastener, the at least one recess, and the annular insert; and wherein the boss aperture and the liner aperture are substantially aligned.

15. A pressure vessel (100) comprising:

a boss (1) defining a boss aperture (8) along a centerline axis (14) and comprising at least one recess (28) configured to receive a fastener (6), wherein the boss further comprises a gland (15) defined in the inner surface (16) encircling the through aperture, and an O-ring (4) positioned within the gland, wherein the boss further comprises a plurality of flat portions (9) and a plurality of rounded portions (20) around its periphery, wherein the plurality of flat portions and the plurality of rounded portions are interspersed around a periphery of the boss;

a liner (3) defining a liner aperture and comprising an interior surface (24), an exterior surface (22), and an annular insert (7) comprising an L-shaped cross-section having a shoulder portion (12) and axially extending provision (13) configured to receive the fastener, wherein the shoulder portion (12) of the annular insert (7) radially extends from the axially extending provision (13) towards the centerline axis, wherein the interior surface defines at least a portion of an interior cavity (26) of the pressure vessel, and wherein the liner is configured to secure the boss to the exterior surface using the at least one fastener, the at least one recess, and the annular insert; and a composite shell (2) covering at least a portion of the exterior surface of the liner and at least a portion of the boss;

wherein the boss aperture and the liner aperture are substantially aligned.

\* \* \* \* \*